(12) United States Patent
Hanson

(10) Patent No.: US 7,419,201 B2
(45) Date of Patent: Sep. 2, 2008

(54) ROOF-RAISING/LOWERING MECHANISM FOR A-FRAME STYLE FOLDING TRAILERS AND METHOD FOR USING THE SAME

(76) Inventor: Christopher H. Hanson, 124 41st Ave., Albany, OR (US) 97322

( * ) Notice: Subject to any disclaimer, the term of this patent is extended or adjusted under 35 U.S.C. 154(b) by 36 days.

(21) Appl. No.: 11/289,205

(22) Filed: Nov. 28, 2005

(65) Prior Publication Data
US 2006/0113823 A1 Jun. 1, 2006

Related U.S. Application Data

(60) Provisional application No. 60/631,998, filed on Nov. 30, 2004.

(51) Int. Cl.
*B60P 3/355* (2006.01)
(52) U.S. Cl. .................. 296/26.06; 296/173; 296/100.1
(58) Field of Classification Search ................. 296/168, 296/171, 173, 175, 26.06, 100.08, 100.1, 296/36
See application file for complete search history.

(56) References Cited

U.S. PATENT DOCUMENTS

| | | | | |
|---|---|---|---|---|
| 2,714,524 A | * | 8/1955 | Swiggum | ............ 296/173 |
| 2,997,330 A | * | 8/1961 | Boultinghouse | ............ 296/3 |
| 4,076,310 A | * | 2/1978 | Schwalm | ............ 298/23 MD |
| 5,503,450 A | * | 4/1996 | Miller | ............ 296/100.08 |
| 5,865,499 A | * | 2/1999 | Keyser | ............ 296/173 |
| 6,343,828 B1 | * | 2/2002 | Young et al. | ............ 296/100.1 |
| 6,840,569 B1 | * | 1/2005 | Leigh | ............ 296/173 |

FOREIGN PATENT DOCUMENTS

| | | | | |
|---|---|---|---|---|
| GB | 1075 | * | 4/1865 | ............ 296/100.1 |
| GB | 3286 | * | 3/1885 | ............ 296/100.08 |
| GB | 4018 | * | 2/1893 | ............ 296/100.08 |
| JP | 404123928 | * | 4/1992 | ............ 296/100.08 |

* cited by examiner

*Primary Examiner*—Dennis H Pedder
(74) *Attorney, Agent, or Firm*—Klarquist Sparkman, LLP

(57) ABSTRACT

In accordance with one embodiment, a roof-raising/lowering mechanism for an A-frame style folding trailer comprises a mechanical lever arm assembly. The lever arm assembly is coupled to the rear roof section, which underlies the front roof section when such sections are in their lowered, overlapping positions. Thus, when the lever arm assembly is operated to raise the rear roof section, it pushes up the front roof section to its raised position. The lever arm assembly can be manually operated and/or power-operated using, for example, an electric motor as the power source.

19 Claims, 5 Drawing Sheets

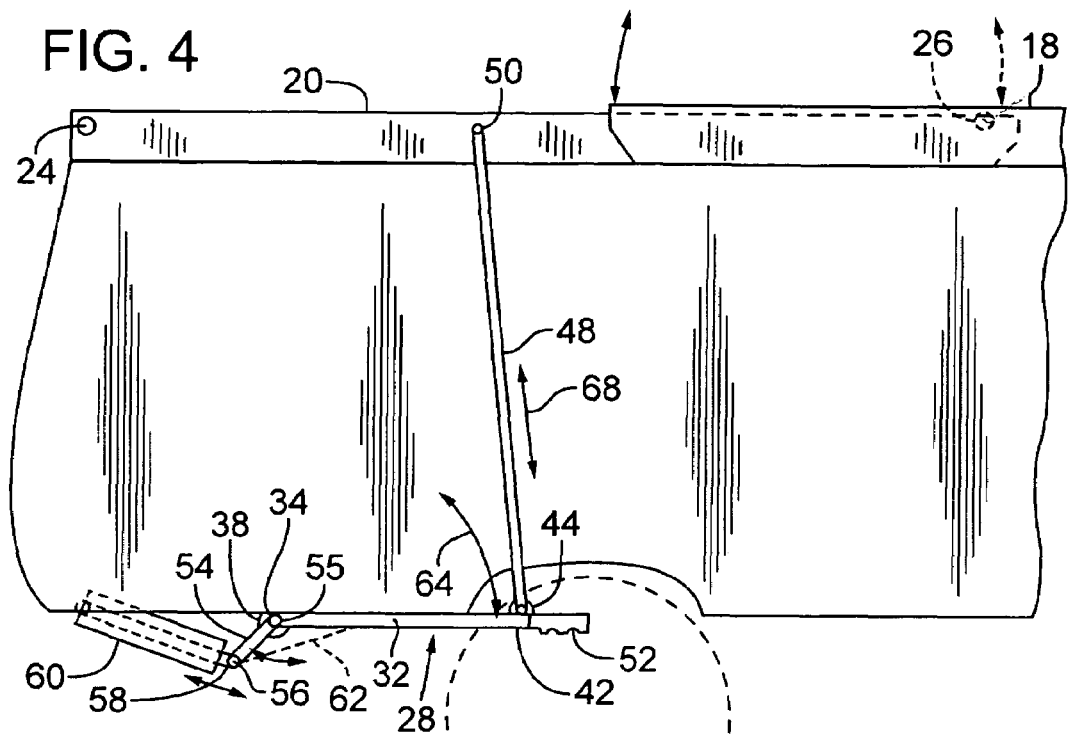
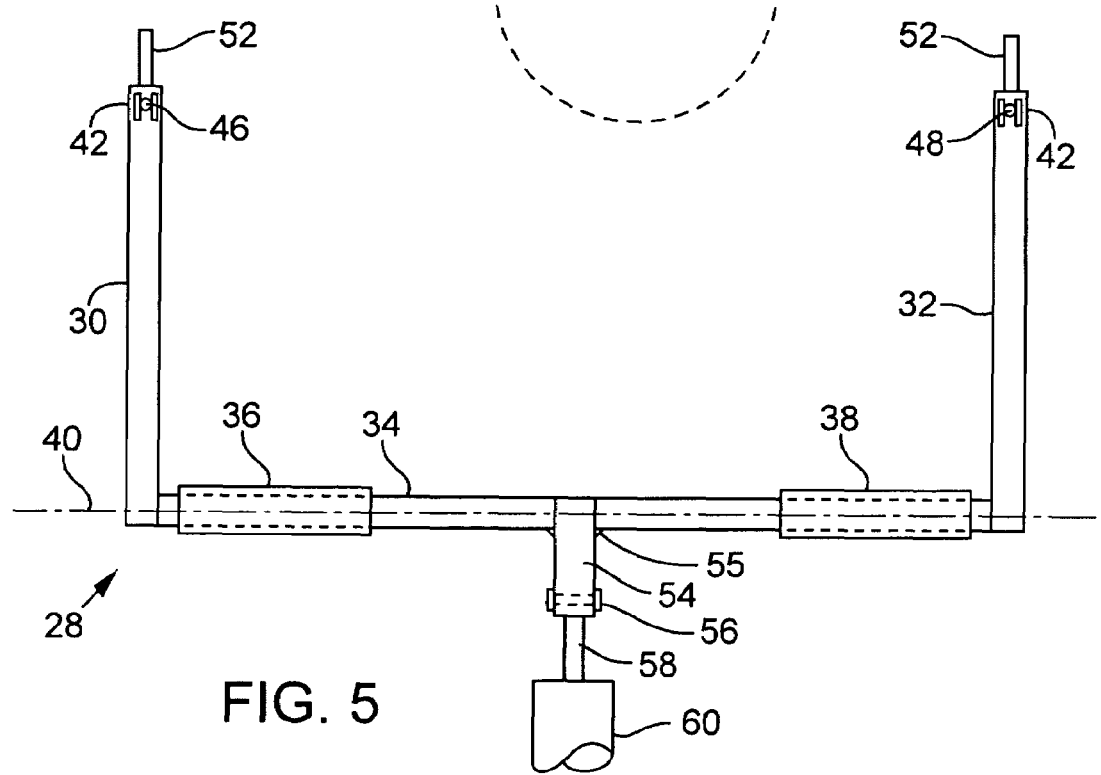

ROOF-RAISING/LOWERING MECHANISM FOR A-FRAME STYLE FOLDING TRAILERS AND METHOD FOR USING THE SAME

CROSS REFERENCE TO RELATED APPLICATION

The present application claims the benefit of U.S. Provisional Application No. 60/631,998, filed Nov. 30, 2004, which is incorporated herein by reference.

FIELD

The present invention relates to recreational vehicles, and more particularly to folding trailers of the type having A-frame-shaped roofs that can be moved between a lowered or collapsed position for travel and a raised "A-frame" position for use.

BACKGROUND

A-frame style folding trailers are well known in the recreational vehicle field. Such trailers typically have two flat and relatively rigid roof sections, one hinged to the rear of the generally rectangular-shaped trailer body and the other hinged to the front of such body. The two roof sections are movable about their hinge axes between lowered, or closed, positions in which the roof sections overlap one another and are in generally horizontal positions covering the top access opening of the trailer body, and raised, or open, positions in which the two roof sections define a generally A-frame roof with the free ends of such sections meeting at the apex of the A-frame roof to provide access to the interior of the trailer body through its open top. Typically, in their folded positions, the front roof section overlaps the rear roof section.

In the past, the raising of the front and rear roof sections has been accomplished manually and with the assistance of four-torsion springs located one at each of the four corners of the rectangular trailer body. Such roof sections were raised manually by a person pushing up on the underlying rear roof section so as to raise both roof sections together, with some assistance from the torsion springs. The roof sections were also lowered manually by a person pulling downward on the roof sections against the force of the torsion springs. Considerable physical exertion is required for a person to raise and lower the roof sections of such trailers. Moreover, such person must be tall enough and strong enough to raise and lower the roof sections. As a result, the size, weight, and height of the roof sections of known A-frame style trailers are limited, and, even then, not everyone had the physical strength or height to use them.

SUMMARY

In accordance with one embodiment, a roof-raising/lowering mechanism comprises a mechanical lever arm assembly that is used to raise and lower the roof sections, or at least assist a person in raising and lowering the roof sections, of an A-frame style folding trailer. In the illustrated embodiment, the lever arm assembly is coupled to the rear roof section and is configured to pivot the rear roof section about its hinge axis between lowered and raised positions. The rear roof section underlies the front roof section when such sections are in their lowered, overlapping positions. Thus, when the lever arm assembly is operated to raise the rear roof section, it pushes up the front roof section to its raised position.

Also in accordance with one embodiment, the lever arm assembly for raising the roof can be manually operated, whereas in another embodiment the lever arm assembly can be power-operated using, for example, an electric motor as the power source. In either case, the lever arm assembly makes it easier for a person to raise and lower the roof sections of an A-frame style folding trailer compared to traditional torsion spring mechanisms.

Also in accordance with one embodiment, the lever arm assembly acts on only one side of a roof section to raise and lower the sections, whereas in another embodiment the lever arm assembly acts on both sides of the roof sections simultaneously to raise and lower such sections.

To facilitate manually operation, the lever arm assembly includes a handle portion that is located at a position such that the handle portion can be easily reached by most users to raise or lower the roof sections. In particular embodiments, for example, the handle portion is maintained at or below the height of the upper edge of the trailer body when lever arm assembly is operated to raise or lower the roof sections. This allows an adult of average height to easily grasp the handle portion for operating the lever arm assembly, either for raising or lowering the roof sections.

Where the lever arm assembly is power-operated, the roof sections of the folding trailer can be raised or lowered without regard to the height or strength of the person involved, the weight of the roof sections, or the height of the roof sections when raised.

In particular embodiments, the roof-raising/lowering mechanism comprises a lever arm assembly including at least one lever arm pivotally mounted to the trailer body portion for movement of a free length thereof alongside the body portion between a retracted position and an upwardly extended position. The mechanism also includes at least one lift arm pivotally connected at one end portion thereof to a free outer end portion of the free length of the lever arm and pivotally connected at an opposite end thereof to the underlying roof section. When the lever arm is in its retracted position, the lift arm maintains the underlying roof section in a closed position. When the lift arm is pivoted to a raised position by the lever arm, the lift arm moves the underlying roof section about its hinge axis to a raised position whereby upward movement of the underlying roof section raises the overlying roof section to its raised position. The roof-raising/lowering mechanism can be provided with a power-operated actuating assembly for pivoting the lever arm between its retracted and upwardly extended positions and/or a lifting handle portion connected to the lever arm for manually pivoting the lever arm.

The lever arm assembly desirably includes first and second lever arms mounted on opposite sides of the body portion. Each lever arm can pivot between respective retracted and upwardly extended positions. A first lift arm is pivotally connected to a free outer end portion of the first lever arm and pivotally connected at an opposite end thereof to the underlying roof section. A second lift arm is pivotally connected to a free outer end portion of the second lever arm and pivotally connected at an opposite end thereof to the underlying roof section, opposite the first lift arm. Upward pivoting of the lever arms to their upwardly extended positions causes corresponding upward movement of the lift arms, which move the roof sections to their raised positions.

The lever arm assembly can also include a cross member extending underneath and transversely with respect to the body portion. The cross member is mounted for rotational movement about its longitudinal axis, which also coincides with the pivot axis of the lower arms. The cross member has first and second opposite ends, with the first end being fixedly (rigidly) secured to a fixed end portion of the first lever arm and the second end being fixedly secured to a fixed end portion of the second lever arm. The cross member interconnects the first and second lever arms such that movement of one of the lever arms between its retracted and upwardly extended positions causes movement of the other lever arm between its retracted and upwardly extended position.

Where a power-operated actuating assembly is used, such a device can be configured to rotate the cross member to effect pivoting of the lever arms between their retracted and upwardly extended positions. In certain embodiments, for example, the power-operated actuating assembly includes an actuator and an extendable and retractable actuating rod. The rod has an outer end portion pivotally connected to an actuating lever arm at one thereof, with the opposite end of the actuating lever arm being fixedly secured to the cross member. To raise the roof sections, the actuating rod is extended, causing pivoting movement of the actuating lever arm in a first direction about the rotation axis of the cross member. The actuating lever arm causes rotation of the cross member and corresponding movement of the lever arms toward their upwardly extended positions, which in turn causes the lift arms to raise the roof sections. Retraction of the actuating rod causes pivoting movement of the actuating lever arm in a second direction, opposite the first direction, about the rotation axis of the cross member, thereby reversing rotation of the cross member and causing corresponding downward pivoting of the lever arms to lower the roof sections.

In another representative embodiment, a trailer assembly has a body portion with an upwardly directed access opening and first and second roof sections overlying the body portion. The roof sections are movable about respective hinged connections to the body portion for movement between closed, lowered positions in which one roof section overlies the other roof section and the roof sections close the access opening, and open, raised positions away from the body portion to provide access to the interior of the body portion through the access opening. The trailer assembly also includes a raising and lowering mechanism for the roof sections comprising at least one elongated lever arm. The lever arm comprises a first, fixed end portion pivotally coupled to the body portion and second, free end portion that can pivot upwardly and downwardly alongside the body portion about a pivot axis extending through the fixed end portion. The raising and lowering mechanism also includes at least one elongated lift arm comprising a lower end portion pivotally coupled to the free end portion of the lever arm and an upper end portion pivotally coupled to the underlying roof section. In use, upward pivoting of the lever arm raises the lift arm, which moves the underlying roof section about its hinged axis to its raised position whereby upward movement of the underlying roof section causes movement of the overlying roof section about its hinged axis to its raised position.

In another representative embodiment, a raising and lowering mechanism for the roof sections of an A-frame style trailer comprises a power-operated actuating assembly that is operatively connected to an underlying roof section of the trailer. The actuating assembly is configured to cause pivoting of the underlying roof section about its hinge axis to its raised position, whereby upward pivoting of the underlying roof section also raises the overlying roof section.

In yet another representative embodiment, a method is provided for raising and lowering first and second roof sections of a trailer assembly having a body portion with an upwardly directed access opening. The roof sections overlie the body portion and are movable about respective hinged connections to the body portion for movement between closed, lowered positions in which one roof section overlies the other roof section and the roof sections close the access opening, and open, raised positions away from the body portion to provide access to the interior of the body portion through the access opening. The method comprises pivoting at least one lever arm alongside the body portion about a pivot axis, the lever arm being pivotally coupled to a lower end portion of a lift arm, which is pivotally coupled at an upper end portion thereof to the underlying roof section, such that pivoting of the lever arm causes corresponding movement of the lift arm, which in turn causes movement of the roof sections between their lowered and raised positions.

The foregoing and other features and advantages of the invention will become more apparent from the following detailed description of several embodiments, which proceeds with reference to the accompanying figures.

BRIEF DESCRIPTION OF THE DRAWINGS

FIG. 4 is a side view of a roof-raising/lowering mechanism shown mounted on an A-frame style trailer, and illustrating how it is powered by an electric motor operated actuator or, alternatively, by a manually operated lever arm.

FIG. 5 is a top plan view of the roof-raising/lowering mechanism of FIG. 4.

DETAILED DESCRIPTION

As used herein, the singular forms "a," "an," and "the" refer to one or more than one, unless the context clearly dictates otherwise.

As used herein, the term "includes" means "comprises."

Figure 1:
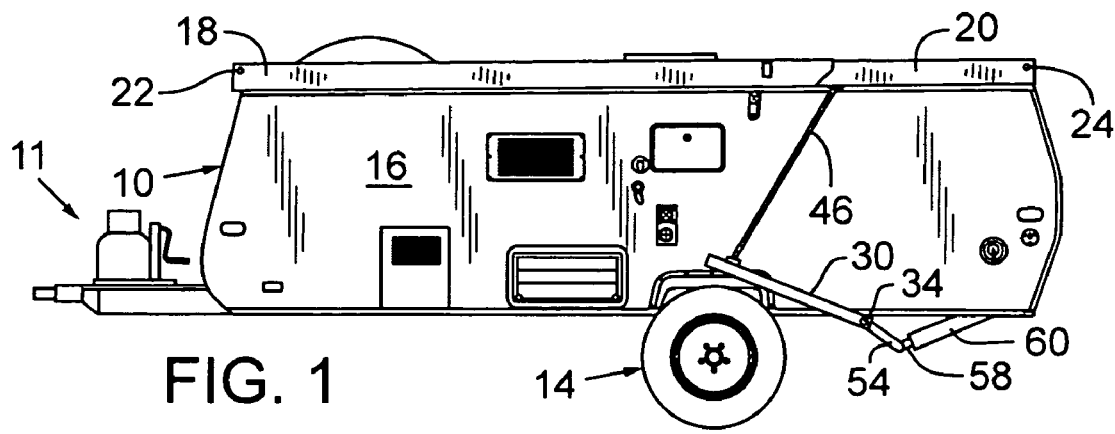
FIG. 1 is an overall side elevational view of an A-frame style trailer with its roof sections in their lowered positions, according to one embodiment.
Figure 2:
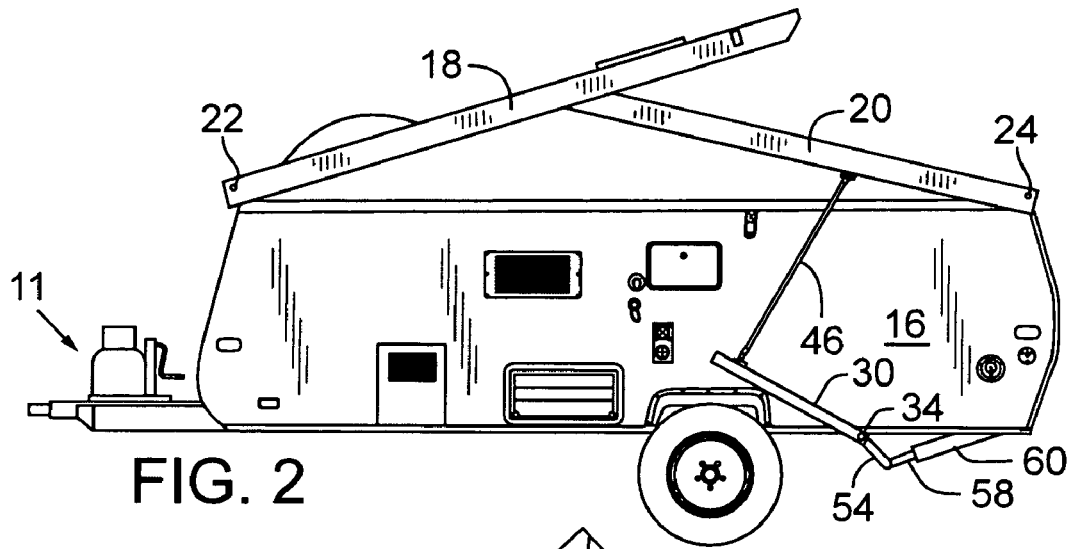
FIG. 2 is a side elevational view similar to FIG. 1, but with the roof sections in their partially raised positions.

In accordance with one embodiment, referring to FIG. 1, a recreational vehicle trailer 10 includes a conventional tow bar 11, axle and wheel assembly 14, and generally rectangular trailer body, or chassis, 16.

Figure 3:
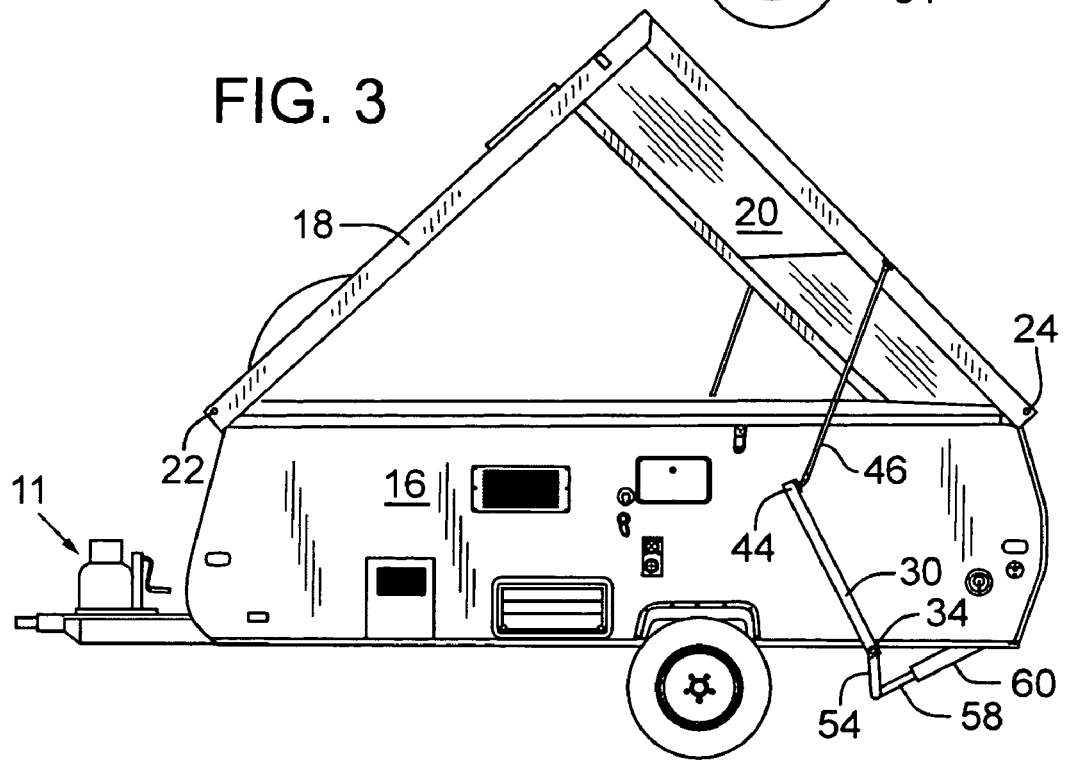
FIG. 3 is a side elevational view of the trailer of FIGS. 1 and 2, but with the roof sections in their fully raised A-frame positions.
Figure 1A:
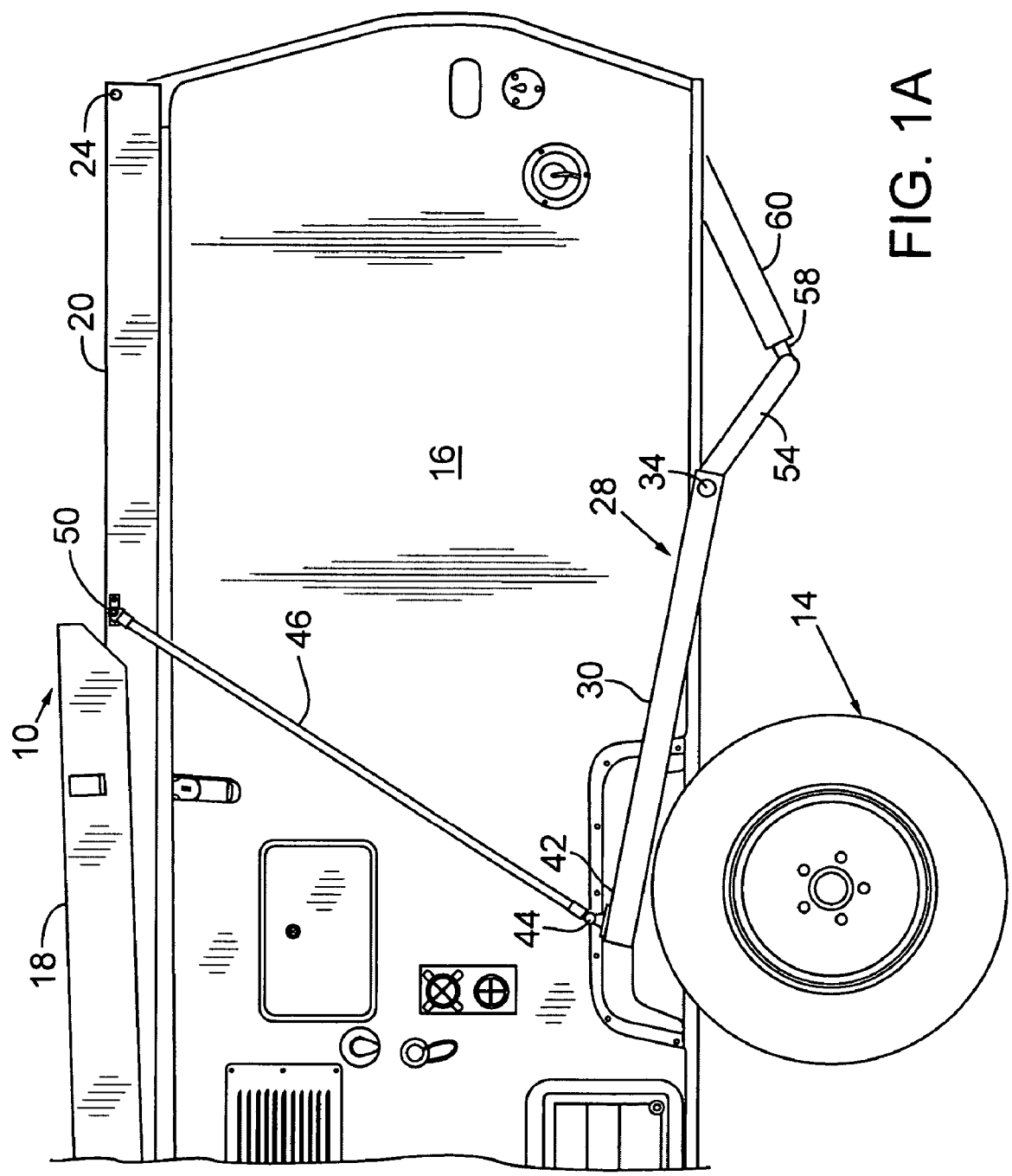
FIG. 1A is an enlarged side elevational view of a rear portion of the A-frame style trailer of FIG. 1 showing its roof sections in their lowered and overlapping positions.
Figure 3A:
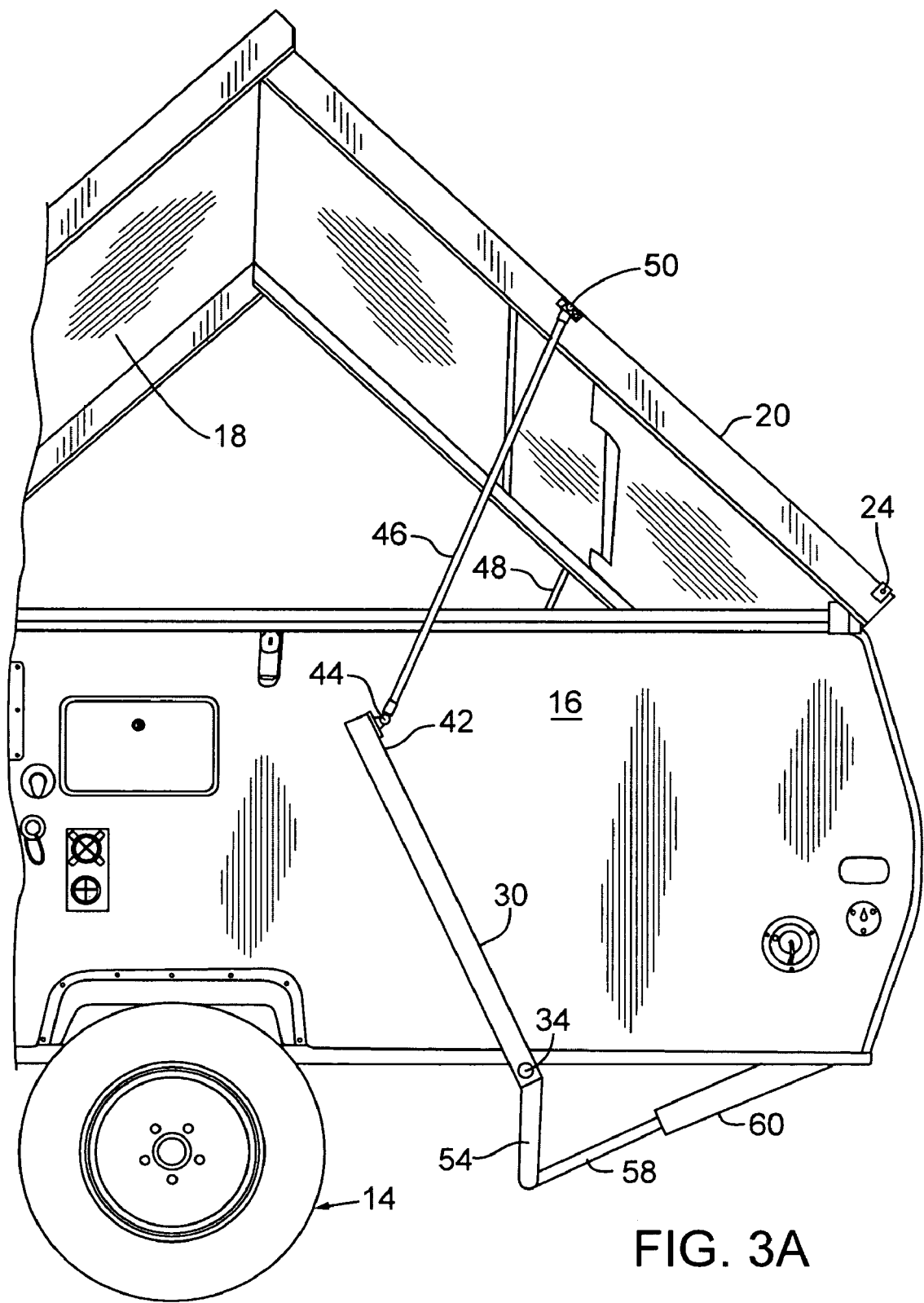
FIG. 3A is an enlarged side view of a rear portion of the trailer as shown in FIG. 3, with its roof sections fully raised.

The trailer is of the so-called A-frame style, meaning that its two roof sections, including a front section 18 and a rear section 20, when erected as shown in FIGS. 3 and 3A, define a generally A-frame shape to help define the enlarged interior of the trailer for use as a camping trailer by occupants. Roof section 18 is hinged to an upper front edge portion of the chassis 16 at 22, whereas the rear roof section 20 is hinged at 24 to an upper rear edge portion of the chassis. Thus, the roof sections may be lowered to collapsed, or closed, positions as shown in FIGS. 1 and 1A, wherein the roof sections are generally parallel to the upper sides of the trailer chassis to overlap one another and cover the upper chassis opening (also referred to herein as an access opening), with the front section 18 overlapping the rear roof section 20. Rear roof section 20 can include a set of rollers 26 (see FIG. 4) adjacent its upper free edge which engage the underside of the front roof section 18 to reduce friction and thereby reduce the force required when raising and lowering the roof sections. The A-frame style trailer as described thus far is conventional.

Referring especially to FIGS. 4 and 5 of the drawings, a roof-raising/lowering mechanical is provided for facilitating the movement of the front and rear roof sections between their closed and open positions. According to one embodiment, the roof-raising/lowering mechanism includes a lever arm assembly generally indicated at 28. The embodiment shown in FIGS. 4 and 5 is a generally U-shaped assembly including a pair of pivot or lever arms 30, 32 mounted on opposite sides of the body portion 16. Each lever arm 30, 32 is joined at one of their respective ends to the opposite ends of a cross member 34. The cross member 34 extends underneath and transversely with respect to the body portion 16. The cross member, or pivot tube, 34 may be in the form of a tubular member as shown, such as a metal pipe, or otherwise of circular cross section. Cross member 34 is rotatably mounted by a pair of bearings 36, 38 to the underside of a rear portion of the body portion 16 as shown in FIG. 4. Thus, the lever arms 30, 32 may be pivoted upwardly and downwardly (as indicated by double-headed arrow 64 in FIG. 4) about the pivot axis 40 of pivot tube 34 within bearings 36, 38 to move the free ends 42 of the lever arms 30, 32 between retracted, lowered positions shown generally in FIGS. 4, 1, and 1A, and upwardly extended, raised positions, shown generally in FIGS. 3 and 3A.

As shown in FIGS. 1-4, the free ends 42 of lever arms 30, 32 are pivotally connected at 44 to the lower ends of, respectively, lift arms 46, 48. The upper ends of the lift arms, in turn, are pivotally connected at 50 to the rear roof section 20 forward of its hinge connection 24 to the trailer body but rearward of the portion of the rear roof section that is overlapped by the front roof section when the roof sections are in their closed positions. Lift arms 46, 48 are moveable upwardly and downwardly (as generally indicated by double-headed arrow 68) upon pivoting movement of lever arms 30, 32.

From the foregoing, it will be apparent that by lifting the free end portions 42 of the lever arms 30, 32 about their pivot axis 40, the lift arms 46, 48 will be raised. The raising of lift arms 46, 48, in turn, will raise the rear roof section 20 about its hinge axis 24. The raising of rear roof section 20, in turn, will push the front roof section 18 about its hinge axis, whereby the roof sections will be elevated to their fully raised, A-frame positions as shown in FIGS. 3 and 3A. The sequential movement of the roof sections between their fully closed, or lowered, positions to their fully raised positions is illustrated sequentially by viewing, in sequence, FIGS. 1 and 1A, FIGS. 2 and 2A, and FIGS. 3 and 3A.

In an alternative embodiment, the lever arm assembly 28 can be mounted towards the front of the body portion 16, with the cross member 34 being mounted to the underside of a front portion of the body portion 16 and the lift arms 46, 48 being pivotally connected to the front roof section 18.

The lever arms 30, 32 of the lever arm assembly 28 may be pivoted between their lowered and raised positions about their common pivot axis 40 to raise and lower the two roof sections using any of various suitable techniques or mechanisms. Two possible implementations are discussed below.

First, the free ends of the lever arms can simply be lifted about their pivot axis manually to cause the lift arms to push the roof sections to their raised positions. In this regard, one person could raise just one of the lever arms to raise the roof sections, or two persons, lifting up on the two lever arms 30, 32 simultaneously, could raise the roof sections. To facilitate the raising of the roof sections in this manner, the free end portions 42 of lever arms 30, 32, can be provided with lift handle extensions, or handle portions, 52 as shown in FIGS. 4 and 5. As shown in FIG. 4, the handle portions 52 are located at about the height of the bottom side of the body portion 16 when the lever arms are in their lowered positions. Also, when the lever arms are in their upwardly extended positions (FIG. 3), the handle portions 52 remain below the upper edge of the body portion 16. This allows most users to easily grasp one of the handle portions 52 for raising or lowering the roof sections. Although one person can easily raise or lower the roof sections by operating one of the lever arms, if desired, two people operating the lever arms at the same time can raise or lower the roof sections with even less effort.

In lieu of or in addition to the handle portions 52, the lever arm assembly may be power actuated to avoid the need to manually operate the assembly. Such a power actuated assembly using an electrically powered actuator is best illustrated in FIG. 4, and is also illustrated sequentially in FIGS. 1A, 2A, and 3A.

To facilitate power actuation, the lever arm assembly 28 is provided with an actuating lever arm 54 rigidly affixed to the pivot tube 34 at 55 midway between the opposite ends of pivot tube 34. The free end of actuating lever 54 is pivotally connected at 56 to an extendable and retractable actuating rod 58 of an electrically powered actuator 60 mounted to a rear underside portion of the trailer body as shown best in FIG. 4. The configuration of the actuator 60 can be conventional. For example, the actuator 60 can have an internal electrically powered screw which may be actuated to reciprocate the actuating rod 58 between an extended position and a retracted position. In its extended position, actuating rod 58 pivots the actuating lever 54 of the lever arm assembly 28 downward to pivot the lever arms 30, 32 upwardly about their common pivot axis 40 to raise the lift arms 46, 48 and thereby push the roof sections 18, 20 upwardly from their closed positions toward their raised positions.

Similarly, when the actuating rod 58 is retracted by the electric actuator, the actuating lever 54, as shown in FIG. 4, is pivoted about axis 40 of the lever arm assembly in a clockwise direction as viewed in FIG. 4 to lower the lever arms 30, 32. The lifting arms are thereby lowered to retract the roof assemblies toward their closed positions.

Figure 2A:
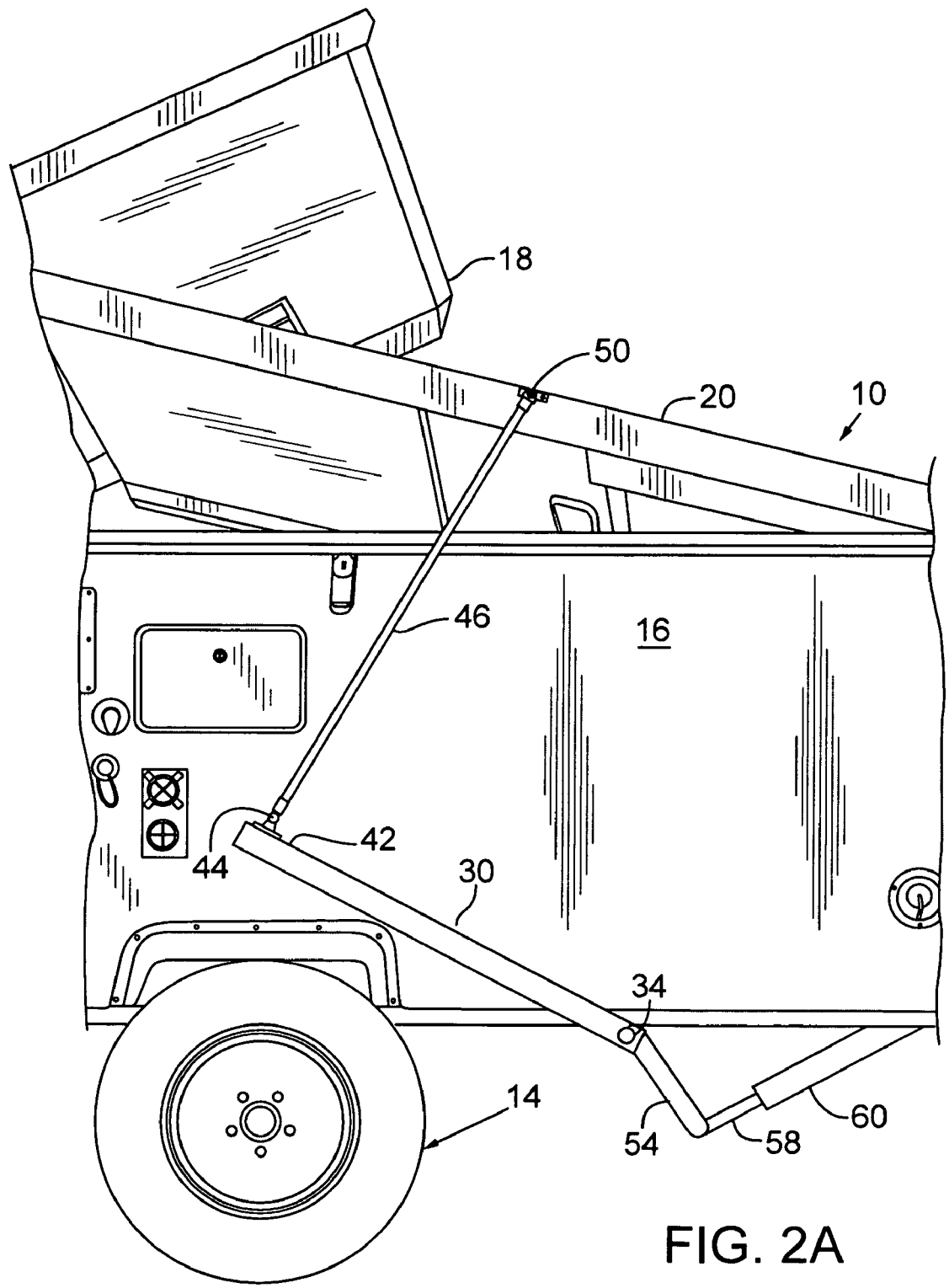
FIG. 2A is an enlarged side view of a rear portion of the trailer as shown in FIG. 2 with its roof sections partially raised.

In FIG. 1A, the electric actuating cylinder 60 is shown with the actuating rod 58 in its fully retracted position. In FIG. 2A, the actuating rod of electric actuating cylinder 60 is shown in a partially extended position whereby the rear roof section 20 and consequently, the front roof section 18, are in their partially raised positions. Finally, in FIG. 3A, the electric actuating cylinder 60 is shown with its actuating rod 58 in its fully extended position, whereby lever arm 30 is in its fully raised position and lift arms 46, 48 have lifted the rear roof section 20 to its fully raised position.

In other embodiments, the actuator 60 can be a hydraulically powered actuator or a pneumatically powered actuator.

In one specific implementation of the raising/lowering mechanism, the handle portions 52 are provided for manually raising and lowering the roof sections, and the power-operated actuating assembly, including the actuating lever arm 54, the actuator rod 58, and the actuator 60, can be omitted. In another implementation, the raising/lowering mechanism can include both the handle portions 54 and the power-actuating assembly (as depicted in FIGS. 4 and 5). In the latter implementation, an actuator that permits extension and retraction of its actuating rod when power is not supplied to the actuator is used so as to permit manual pivoting of the lever arms 30, 32 without use of the actuator 60. Alternatively, the actuating assembly can be configured to be disconnected from the cross member 34, such as by disconnecting the actuating rod 58 from the actuating lever arm 54, so that the lever arms 30, 32 can be manually pivoted without use of the actuator.

Although in the illustrated embodiments, the roof-raising/lowering mechanism has been described with respect to a lever-operated lifting mechanism including a pair of lever arms, one extending along each side of the vehicle body, such assembly may include a lever arm assembly with only a single lever arm along only one side of the vehicle body. Such lever arm would be pivotally connected to a single lift arm connected to only one side of the underlying roof section. Thus, all lifting action would occur along such side of the connected roof section. With such an embodiment, of course, the pivot tube 34 would not need to extend across the full width of the underside of the trailer body. Instead, it could be mounted to the same underside of the vehicle as the single connected lever arm. Similarly, the power actuator unit could be connected to the pivot tube 34 adjacent the same side of the vehicle as the single lever arm.

It should also be mentioned that with both the manual and power actuated versions of the invention as described, lifting may be assisted by the use of an optional torsion or coil spring positioned as shown at 62 in FIG. 4. Such a spring would be especially useful in the manually actuated version of the invention.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. In a trailer assembly having a body portion with an upwardly directed access opening and a pair of first and second roof sections overlying the body portion and movable about respective hinged connections to the body portion for movement between closed positions in which one roof section overlies the other and said roof sections close said access opening, and open positions wherein free edge portions of the roof sections abut one another to provide access to the interior of the body portion through said access opening, a raising and lowering mechanism for the roof sections comprising:

a lever arm assembly including at least one lever arm coupled at one end to a cross member mounted to said body portion, wherein rotation of the cross member causes movement of a free length of said lever arm alongside said body portion between a retracted position and an upwardly extended position; and at least one lift arm pivotally connected at one end portion thereof to a free outer end portion of the free length of said lever arm and pivotally connected at an opposite end thereof to the underlying roof section such that when the lever arm is in its retracted position, the lift arm maintains the underlying roof section in a closed position and such that when the lift arm is moved to a raised position by the lever arm, the lift arm moves the underlying roof section about its hinge axis to a raised position whereby upward movement of the underlying roof section raises the overlying roof section to its raised position also;

wherein the at least one lever arm comprises first and second lever arms on opposite sides of the body portion, each lever arm being coupled to the body portion for movement of a free length thereof alongside and outside of the body portion between a respective retracted position and a respective upwardly extended position; and wherein the at least one lift arm comprises first and second lift arms, the first lift arm being pivotally connected to a free outer end portion of the free length of the first lever arm and pivotally connected at an opposite end thereof to the underlying roof section, the second lift arm being pivotally connected to a free outer end portion of the free length of the second lever arm and pivotally connected at an opposite end thereof to the underlying roof section, such that when the lever arms are in their retracted positions, the arms maintain the underlying roof section in its closed position and when the lift arms are moved to respective raised positions by the lever arms, the lift arms move the underlying roof section about its hinged axis to its raised position whereby upward movement of the underlying roof section raises the overlying roof section to its raised position;

wherein the cross member extends underneath and transversely with respect to the body portion, the cross member having first and second opposite ends, the first end being fixedly secured to a fixed end portion of the first lever arm, and the second end being fixedly secured to a fixed end portion of the second lever arm, such that movement of one of the lever arms between its retracted position and upwardly extended position causes movement of the other lever arm between its retracted position and upwardly extended position; and a power-operated actuating assembly coupled to the cross member and configured to cause rotation of the cross member about a rotation axis extending through the fixed end portions of the lever arms, thereby causing movement of the levers arms between their retracted and upwardly extended positions.

2. In a trailer assembly having a body portion with an upwardly directed access opening and a pair of first and second roof sections overlying the body portion and movable about respective hinged connections to the body portion for movement between closed positions in which one roof section overlies the other and said roof sections close said access opening, and open positions wherein free edge portions of the roof sections abut one another to provide access to the interior of the body portion through said access opening, a raising and lowering mechanism for the roof sections comprising:

a lever arm assembly including at least one lever arm pivotally mounted to said body portion for movement of a free length thereof alongside said body portion between a retracted position and an upwardly extended position; and at least one lift arm pivotally connected at one end portion thereof to a free outer end portion of the free length of said lever arm and pivotally connected at an opposite end thereof to the underlying roof section such that when the lever arm is in its retracted position, the lift arm maintains the underlying roof section in a closed position and such that when the lift arm is moved to a raised position by the lever arm, the lift arm moves the underlying roof section about its hinge axis to a raised position whereby upward movement of the underlying roof section raises the overlying roof section to its raised position also, wherein the lever arm includes a lifting handle portion for manually pivoting said lever arm between its retracted and extended positions for raising and lowering the roof sections, the lifting handle forming an extension of the free outer end portion of the lever arm such that raising and lowering the lifting handle alongside the body portion causes the lever arm to pivot between its retracted position and its upwardly extended position.

3. The raising and lowering mechanism of claim 1, wherein the power-operated actuating assembly comprises an actuator and an extendable and retractable actuating rod, the actuating rod having an outer end portion pivotally connected to an actuating lever arm at one end thereof, the opposite end of the actuating lever arm being fixedly secured to the cross member, such that extension of the actuating rod causes pivoting movement of the actuating lever arm in a first direction about the rotation axis of the cross member, thereby causing rotation of the cross member and corresponding movement of the lever arms toward their upwardly extended positions, and refraction of the actuating rod causes pivoting movement of the actuating lever arm in a second direction, opposite the first direction, about the rotation axis, thereby reversing rotation of the cross member and causing corresponding movement of the lever arms toward their retracted positions.

4. The raising and lowering mechanism of claim 1, wherein the power-operated actuating assembly is electrically actuated.

5. The raising and lowering mechanism of claim 1, further comprising a spring operatively connected to the first lever arm and configured to exert a biasing force onto the first lever arm to assist movement of the first lever arm toward its upwardly extending position.

6. The raising and lowering mechanism of claim 1, wherein at least the first lever arm includes a lifting handle portion extending from the free outer end portion thereof, the lifting handle portion allowing the first lever arm to be manually pivoted between its retracted and extended positions, whereby such manual pivoting of the first lever arm causes corresponding pivoting of the second lever arm.

7. The raising and lowering mechanism of claim 1, wherein the lift arms are pivotally connected to the underlying roof section at a location intermediate the hinged axis of the underlying roof section and the free edge portion of the overlying roof section.

8. The raising and lowering mechanism of claim 2, wherein the lifting handle portion is located adjacent the bottom edge of the body portion when the lever arm is in the refracted position.

9. The raising and lowering mechanism of claim 2, wherein the lifting handle portion does not extend above the upper edge of the body portion when the lever arm is in the extended position.

10. A trailer assembly having a body portion with an upwardly directed access opening and first and second roof sections overlying the body portion and being movable about respective hinged connections to the body portion for movement between closed, lowered positions in which one roof section overlies the other roof section and the roof sections close the access opening, and open, raised positions away from the body portion to provide access to the interior of the body portion through the access opening, the trailer assembly also comprising a raising and lowering mechanism for the roof sections comprising:

at least one elongated lever arm comprising a first, fixed end portion coupled to a cross member at a fixed location relative to the body portion and a second, free end portion that can pivot upwardly and downwardly alongside the body portion about a pivot axis extending through the fixed end portion, wherein rotation of the cross member about a rotation axis causes pivoting of the lever arm, the rotation axis being parallel to the pivot axis; and at least one elongated lift arm comprising a lower end portion pivotally coupled to the free end portion of the lever arm and an upper end portion pivotally coupled to the underlying roof section;

wherein upward pivoting of the lever arm raises the lift arm, which moves the underlying roof section about its hinge axis to its raised position whereby upward movement of the underlying roof section causes movement of the overlying roof section about its hinge axis to its raised position.

11. The trailer assembly of claim 10, wherein:

the at least one lever arm comprises first and second lever arms on opposite sides of the body portion, each lever arm having a fixed end portion pivotally coupled to the body portion and a free end portion that can pivot upwardly and downwardly about the pivot axis, which extends through the fixed end portions of the lever arms; and the at least one lift arm comprises first and second lift arms, the first lift arm comprising a lower end portion pivotally coupled to the free end portion of the first lever arm and an upper end portion pivotally coupled to the underlying roof section, the second lift arm comprising a lower end portion pivotally coupled to the free end portion of the second lever arm and an upper end portion pivotally coupled to the underlying roof section;

wherein upward pivoting of the first and second lever arms raise the first and second lift arms, respectively, which move the underlying roof section about its hinged axis to its raised position whereby upward movement of the underlying roof section causes movement of the overlying roof section about its hinged axis to its raised position.

12. The trailer assembly of claim 11, wherein the cross member extends underneath and transversely with respect to the body portion, the cross member having first and second opposite ends, the first end being fixedly secured to the fixed end portion of the first lever arm, and the second end being fixedly secured to the fixed end portion of the second lever arm, such that upward pivoting of one of the lever arms causes the other lever arm to pivot upward.

13. In a trailer assembly having a body portion with an upwardly directed access opening and first and second roof sections overlying the body portion and being movable about respective hinged connections to the body portion for movement between closed, lowered positions in which one roof section overlies the other roof section and the roof sections close the access opening, and open, raised positions away from the body portion to provide access to the interior of the body portion through the access opening, a raising and lowering mechanism for the roof sections comprising:

a power-operated actuating assembly having at least one actuator with at least one extendable and retractable actuating rod, which is pivotally connected to a free end of at least one actuating lever arm; and a lever arm assembly connecting the actuating assembly to the underlying roof section, wherein the lever arm assembly comprises:

at least at least one elongated lever arm comprising a first, fixed end portion coupled to the actuating lever arm and a second, free end portion that can pivot upwardly and downwardly alongside the body portion about a pivot axis extending through the fixed end portion; and at least one elongated lift arm comprising a lower end portion pivotally coupled to the free end portion of the lever arm and an upper end portion pivotally coupled to the underlying roof section, wherein extension of the actuating rod causes pivoting movement of the actuating lever arm, thereby causing upward pivoting of the lever arm about its pivot axis to raise the lift arm, which moves the underlying roof section about its hinge axis to its raised position whereby upward movement of the underlying roof section causes movement of the overlying roof section about its hinge axis to its raised position.

14. A method for raising and lowering first and second roof sections of a trailer assembly having a body portion with an upwardly directed access opening and the roof sections overlying the body portion and being movable about respective hinged connections to the body portion for movement between closed, lowered positions in which one roof section overlies the other roof section and the roof sections close the access opening, and open, raised positions away from the body portion to provide access to the interior of the body portion through the access opening, the method comprising:
   pivoting at least one lever arm alongside the body portion about pivot axis that is fixed relative to the body portion, the lever arm being supported at its lower end by a cross member extending transversely of the body portion, such that pivoting of the lever arm causes rotation of the cross member, the lever arm being pivotally coupled to a lower end portion of a lift arm, which is pivotally coupled at an upper end portion thereof to the underlying roof section, such that pivoting of the lever arm causes corresponding movement of the lift arm, which in turn causes movement of the roof sections between their lowered and raised positions.

15. The method of claim 14, wherein pivoting the at least one lever arm comprises pivoting the at least one lever arm upwardly about the pivot axis to an upwardly extended position to cause corresponding upward movement of the lift arm to move the underlying roof section to its raised position, whereby movement of the underlying roof section raises the overlying roof section to its raised position.

16. The method of claim 15, further comprising pivoting the at least one lever arm downwardly from the upwardly extended position to a lowered position to lower the roof sections to their lowered positions.

17. The method of claim 14, wherein pivoting the at least one lever arm comprises actuating a power-operated actuating assembly operatively connected to the lever arm to effect pivoting of the lever arm.

18. The method of claim 14, wherein pivoting the at least one lever arm comprises manually pivoting the lever arm.

19. In a trailer assembly having a body portion with an upwardly directed access opening and a pair of first and second roof sections overlying the body portion and movable about respective hinged connections to the body portion for movement between closed positions in which one roof section overlies the other and said roof sections close said access opening, and open positions wherein free edge portions of the roof sections abut one another to provide access to the interior of the body portion through said access opening, a raising and lowering mechanism for the roof sections comprising:
   first and second lever arms mounted on opposite sides of the body portion, each lever arm having a fixed end portion pivotally coupled to the body portion and a free end portion that can pivot upwardly and downwardly about a pivot axis extending through the fixed end portions; and
   first and second lift arms, the first lift arm comprising a lower end portion pivotally coupled to the free end portion of the first lever arm and an upper end portion pivotally coupled to the underlying roof section, the second lift arm comprising a lower end portion pivotally coupled to the free end portion of the second lever arm and an upper end portion pivotally coupled to the underlying roof section opposite the first lift arm;
   a cross member extending underneath and transversely with respect to the body portion, the cross member having first and second opposite ends, the first end being fixedly secured to the fixed end portion of the first lever arm, and the second end being fixedly secured to the fixed end portion of the second lever arm; and
   a power-operated actuating assembly coupled to the cross member and configured to cause rotation of the cross member about the pivot axis of the lever arms, the power-operated actuating assembly comprises an actuator and an extensible actuating rod, the actuating rod having an outer end portion pivotally connected to an actuating lever arm at one end thereof, the opposite end of the actuating lever arm being fixedly secured to the cross member;
   wherein extension of the actuating rod causes pivoting movement of the actuating lever arm in a first direction about the pivot axis, thereby causing rotation of the cross member and corresponding upward pivoting of the lever arms, which raise the first and second lift arms, respectively, which in turn move the underlying roof section about its hinge axis to its raised position whereby upward movement of the underlying roof section causes movement of the overlying roof section about its hinge axis to its raised position;
   wherein refraction of the actuating rod causes pivoting movement of the actuating lever arm in a second direction, opposite the first direction, about the pivot axis, thereby reversing rotation of the cross member and causing corresponding downward pivoting of the lever arms to lower the roof sections to their lowered positions.

* * * * *

UNITED STATES PATENT AND TRADEMARK OFFICE
CERTIFICATE OF CORRECTION

PATENT NO. : 7,419,201 B2
APPLICATION NO. : 11/289205
DATED : September 2, 2008
INVENTOR(S) : Christopher H. Hanson Page 1 of 1

It is certified that error appears in the above-identified patent and that said Letters Patent is hereby corrected as shown below:

In the Claims:
Column 9, line 14, "refraction of the actuating," should be --retraction of the actuating--.

Signed and Sealed this

Twentieth Day of April, 2010

David J. Kappos
*Director of the United States Patent and Trademark Office*